US008018883B2

(12) United States Patent
Bowser et al.

(10) Patent No.: US 8,018,883 B2
(45) Date of Patent: Sep. 13, 2011

(54) WIRELESS TRANSMITTER IDENTITY VALIDATION IN A WIRELESS NETWORK

(75) Inventors: Robert A. Bowser, Copley, OH (US); Paul J. Stager, Akron, OH (US); Allan Thomson, Pleasanton, CA (US); Bretton Lee Douglas, Normal, IL (US)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 11/691,041

(22) Filed: Mar. 26, 2007

(65) Prior Publication Data
US 2008/0244707 A1    Oct. 2, 2008

(51) Int. Cl.
*H04B 7/00* (2006.01)
*H04W 4/00* (2009.01)
*G06F 7/04* (2006.01)

(52) U.S. Cl. ............... 370/310.1; 370/338; 726/4
(58) Field of Classification Search ........ 370/310.1
See application file for complete search history.

(56) References Cited

U.S. PATENT DOCUMENTS

| | | | | |
|---|---|---|---|---|
| 5,555,551 | A * | 9/1996 | Rudokas et al. | 455/410 |
| 7,378,964 | B1 * | 5/2008 | Amir et al. | 340/539.32 |
| 2003/0086479 | A1 * | 5/2003 | Naguib | 375/144 |
| 2005/0254474 | A1 * | 11/2005 | Iyer et al. | 370/338 |
| 2006/0114863 | A1 * | 6/2006 | Sanzgiri et al. | 370/338 |
| 2006/0168056 | A1 * | 7/2006 | Gandhi et al. | 709/206 |
| 2008/0178000 | A1 * | 7/2008 | Ishidoshiro | 713/164 |

OTHER PUBLICATIONS

"RF Fingerprinting: Enabling Accurate Location Tracking for WLANs," Airespace, Inc. now owned by Cisco Systems, Inc., San Jose, CA. Downloaded Mar. 8, 2007. Available online at: http://www.airespace.com/technology/technote_rf_fingerprinting.php.

M. Barbeau, J. Hall and E. Kranakis, "Detecting Impersonation Attacks in Future Wireless and Mobile Networks," in proceedings of Mobile Ad-hoc Networks and Sensors workshop (MADNES), Sep. 2005, Singapore. Available (Nov. 22, 2006) at www.scs.carleton.ca/~jhall2/publications.html.

Cherita L. Corbett, "Securing Access to Wireless Local Area Networks Using a Passive Approach to Device Identification," PhD Dissertation, School of Electrical and Computer Engineering, Georgia Institute of Technology, Atlanta GA, May 2006. Available (Mar. 12, 2007) at http://etd.gatech.edu/theses/available/etd-04052006-163101/unrestricted/corbett_cherita_200605_phd.pdf.

(Continued)

*Primary Examiner* — Lester Kincaid
*Assistant Examiner* — Yu (Andy) Gu
(74) *Attorney, Agent, or Firm* — Dov Rosenfeld; Inventek

(57) ABSTRACT

An apparatus, a method, and logic encoded in computer readable media that when executed operable to carry out the method. The method includes wirelessly receiving at a receiving station a signal transmitted from a transmitting station in a wireless network. The signal includes a network identifier, e.g., MAC address of the transmitting station. The method includes determining one or more RF waveform characteristics of at least a transient part of the received signal, decoding the received signal to determine the network identifier, e.g., MAC address, determining one or more behavior characteristics from the received signal; and using the decoded network identifier, e.g., MAC address and a combination of the one or more waveform characteristics and the one or more behavior characteristics to ascertain whether or not the network identifier, e.g., MAC address is a spoofed identifier, the ascertaining using historical samples of combinations for different network identifiers.

27 Claims, 5 Drawing Sheets

OTHER PUBLICATIONS

K.J. Ellis and N. Serinken, "Characteristics of radio transmitter fingerprints," Radio Science, vol. 36, Issue 4, p. 585-598, Jul. 2001.

J. Hall, M. Barbeau and E. Kranakis, "Anomaly-based Intrusion Detection Using Mobility Profiles of Public Transportation Users," in proceedings of IEEE International Conference on WiMob 2005 (Wireless and Mobile Computing, Networking and Communications), Montreal, Quebec, Canada. Available (Nov. 22, 2006) at www.scs.carleton.ca/~jhall2/publications.html.

J. Hall, M. Barbeau and E. Kranakis, "Radio Frequency Fingerprinting for Intrusion Detection in Wireless Networks," submitted to IEEE Transactions on Dependable and Secure Computing. Available (Nov. 22, 2006) at www.scs.carleton.ca/~jhall2/publications.html.

J. Hall, M. Barbeau and E. Kranakis, "Detecting Rogue Devices in Bluetooth Networks Using Radio Frequency Fingerprinting," to appear in Proceedings of the IASTED International Conference on Communications and Computer Networks, Lima, Peru, Oct. 2006, p. 6. Available (Nov. 22, 2006) at www.scs.carleton.ca/~jhall2/publications.html.

J. Hall, M. Barbeau, E. Kranakis, "Detection of Transient in Radio Frequency Fingerprinting Using Signal Phase," in proceedings of the 3rd IASTED International Conference on Wireless and Optical Communications (WOC 2003), Jul. 14-16, 2003, Banff, Alberta, Canada. Available (Mar. 8, 2007) at http://www.scs.carleton.ca/~canccom/Publications/hall03.pdf.

J. Hall, M. Barbeau and E. Kranakis, "Enhancing Intrusion Detection in Wireless Networks Using Radio Frequency Fingerprinting," Communications, Internet and Information Technology (CIIT), St. Thomas, US Virgin Islands, Nov. 22-24, 2004. Available (Nov. 22, 2006) at www.scs.carleton.ca/~jhall2/publications.html.

J. Hall, M. Barbeau and E. Kranakis, "Using Mobility Profiles for Anomaly-based Intrusion Detection in Mobile Networks," Network and Distributed System Security Symposium (NDSS) Pre-conference Workshop on Wireless and Mobile Security, Apr. 2005, San Diego, US. Available (Nov. 22, 2006) at www.scs.carleton.ca/~jhall2/publications.html.

Douglas Madory, "New Methods of Spoof Detection in 802.11b Wireless Networking," Masters Thesis, Dartmouth College, Thayer School of Engineering, Hanover, NH, Jun. 2006. Downloaded Mar. 11, 2007. Available online at http://www.ists.dartmouth.edu/library/195.pdf.

Peter Judge, "WiFi fingerprints could end MAC spoofing: Positive IDs for all the world's wireless kit?" Techworld, Sep. 5, 2006. Downloaded Nov. 22, 2006 from http://www.techworld.com/news/index.cfm?newsID=6787&printerfriendly=1.

Jack Shandle, "University research aims at more secure Wi-Fi," Wireless.Net Design Line, Sep. 1, 2006, available (Mar. 12, 2006) at http://www.wirelessnetdesignline.com/showArticle.jhtml?articleID=192501207.

Joshua Wright, "Detecting Wireless LAN MAC Address Spoofing," White Paper, Johnson & Wales University, Jan. 21, 2003. Downloaded Mar. 11, 2007. Available online at: http://www.net-security.org/dl/articles/wlan-mac-spoof.pdf.

* cited by examiner

WIRELESS TRANSMITTER IDENTITY VALIDATION IN A WIRELESS NETWORK

FIELD OF THE INVENTION

The present disclosure relates generally to wireless networks.

BACKGROUND

A network entity such as a transmitting station in a traditional wireless network such as a wireless local area wireless (WLAN) that conforms to the IEEE 802.11 standard, or a personal area network (PAN) such as one that conforms to the Bluetooth standard is typically identified by a network identifier included in data sent by the entity. For example, a network conforming to the IEEE 802.11 standard uses the media access control (MAC) address of the transmitting station (the sender) to serve as the unique identifier of the sender. Software may readily be written and available that can alter the source MAC address of a transmitting station, called spoofing. Such spoofing can cause many problems in the network. For example, location tracking within a wireless network such as a WLAN is becoming commonplace. Furthermore, radio location tags are now available that use WLAN technology to transmit information about assets to which they are attached. Spoofing can present a problem for wireless-network-based location tracking system since the location of a critical and/or valuable resource can thus be intentionally misrepresented. For example, a laptop or personal digital assistant (PDA) could be configured to transmit wireless packets using a duplicated source MAC address of a location tag connected to an asset of high value. The location tag on that asset could then be disabled, enabling theft or tampering of the high value asset.

Research has shown that the characteristics of a transmitting wireless station vary across equipment. Research has shown, for example, that the waveform from a transmitting station, in particular, the turn-on transient information in such a waveform is usable to characterize a transmitting station, and a "RF fingerprint" determined from such information may be used to characterize, even uniquely characterize a transmitting station. RF fingerprinting to determine such an RF fingerprint has been applied to both military and cellular telephone applications.

There is still room in the art for techniques applicable to detecting spoofing in a wireless network.

SUMMARY

Embodiments of the present invention include a method, and apparatus, and logic encoded in one or more computer-readable tangible medium to carry out a method. The method is to ascertain from a received signal containing a source address whether the station that transmitted the signal is the authentic transmitter authentically having the contained source address.

One embodiment includes a method comprising wirelessly receiving at a receiving station a signal transmitted from a transmitting station in a wireless network. The signal includes a network identifier, e.g., MAC address of the transmitting station. The method includes determining one or more RF waveform characteristics of at least a transient part of the received signal, decoding the received signal to determine the network identifier, e.g., MAC address, determining one or more behavior characteristics from the received signal; and using the decoded network identifier, e.g., MAC address and a combination of the one or more waveform characteristics and the one or more behavior characteristics to ascertain whether or not the network identifier, e.g., MAC address is a spoofed identifier, the ascertaining using historical samples of combinations for different network identifiers, e.g., MAC addresses.

One embodiment includes an apparatus comprising one or more antennas and a radio front-end, one or more analog-to-digital converters coupled to the radio front-end and operable to form samples of a signal received via the antennas at the radio front-end, and a baseband and MAC processing system that includes a baseband processing subsystem coupled to the one or more analog-to-digital converters and a MAC processing subsystem. The baseband and MAC processing system is operable to process the samples of the received signal, including demodulating and decoding the samples; forming received MAC frames; and decoding any network identifier, e.g., MAC address of the transmitting station of the received signals contained in the in the MAC frames. The apparatus further includes a host processing system including one or more host processors, a host memory; and a network interface operable to couple the apparatus to a network. The baseband and MAC processing system includes a transient characteristic calculation subsystem operable to determine one or more waveform characteristics from the part of the received signal, and a behavior characteristic calculation subsystem operable to determine one or more behavior characteristics, wherein the combination of the baseband and MAC processing system and the host processing system is operable to form a defined combination of the one or more determined waveform characteristics and the one or more determined behavior characteristics and ascertain, using the formed combination and historical samples of combinations for different network identifiers, e.g., MAC addresses, whether or not the decoded network identifier, e.g., MAC address is a spoofed network identifier, e.g., spoofed MAC address.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Embodiments of the present invention include a method, and apparatus, and logic encoded in one or more computer-readable tangible medium to carry out a method. The method includes determining whether the source address encoded in a wirelessly received wireless signal is authentic.

Figure 1:
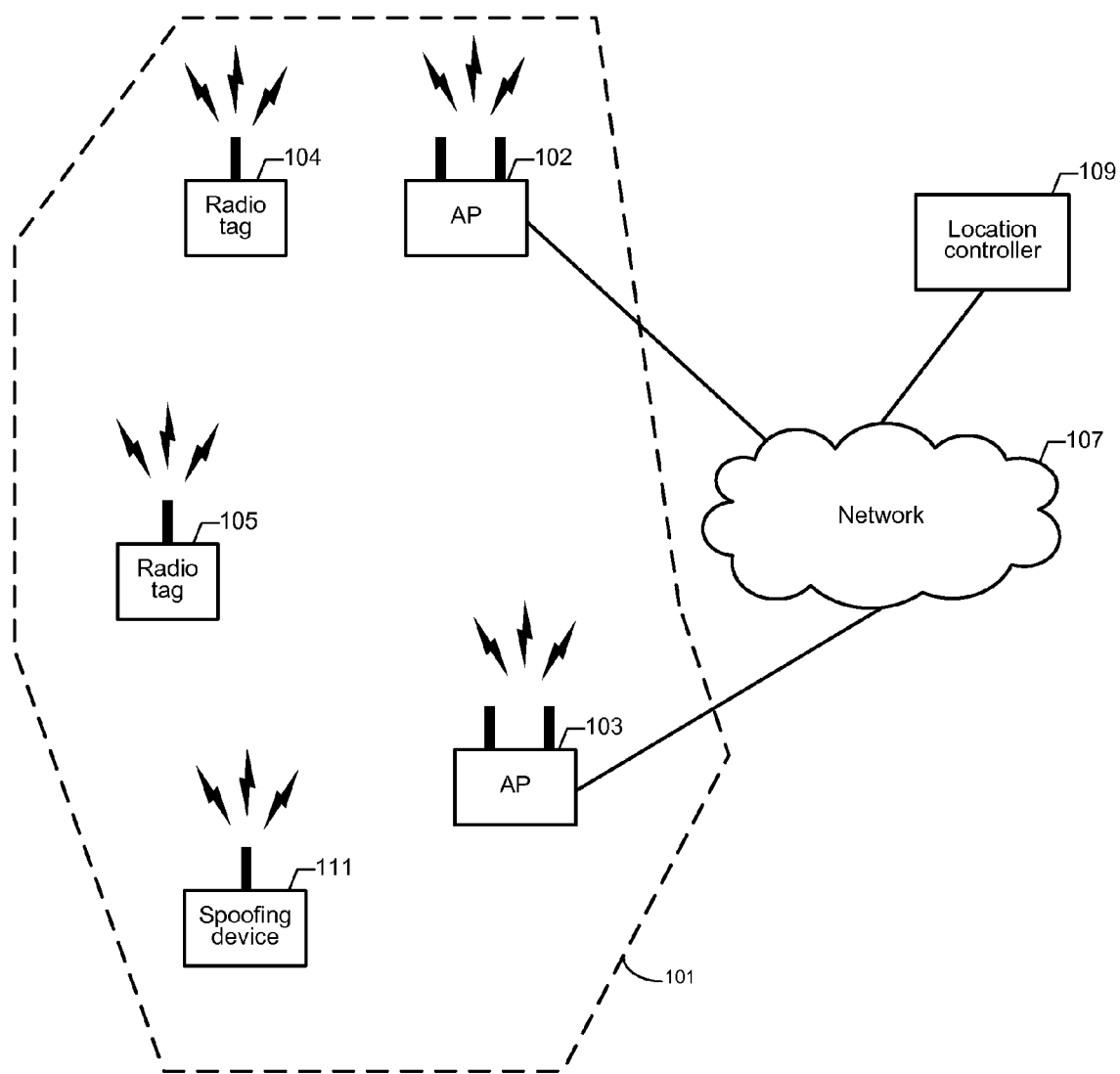
FIG. 1 shows an environment in which an embodiment of the present invention that uses WLAN technology can operate.

FIG. 1 shows an environment in which an embodiment of the present invention that uses WLAN technology can operate. A plurality of receiving stations, e.g., access points (APs) that conform to the IEEE 802.11 WLAN standard, are placed at known locations in a region 101. Only two such access points 102, 103 are shown in FIG. 1. The access points are coupled to a network 107 to which a location controller 109 is coupled. A plurality of active location tags each includes a transmitting wireless station and from time to time transmits data, e.g., IEEE 802.11 packets. Two such transmitting stations 104, 105 are shown. Each transmitted packet includes identifying information including the MAC address of the transmitting station. For any transmitting station, a plurality of the APs may receive the transmitted packets. Information about the data received, e.g., as path loss of timing information is sent by each AP to the location controller 109. The location controller 109 is operative to determine the location of the radio tags using path loss information, time difference of arrival information, and/or other information depending on the particular implementation.

A spoofing device 111, possibly a malicious spoofing device pretends to be a radio tag, e.g., including using the network identifier, e.g., MAC address of a radio tag, and transmits packets that mimic those transmitted by an authentic tag. One apparatus embodiment of the invention includes in the AP apparatus that is operative to ascertain whether a signal received at the AP, such a signal corresponding to packets transmitted from a transmitting station, was transmitted by the device that has the network identifier, e.g., MAC address decoded from the received signal.

In one embodiment, the location controller also controls other aspects of the network, and is called a centralized network controller (CNC) herein.

In the remainder of the description, it is assumed that the MAC address is used as the identifier of a transmitting entity in the wireless network. Other identifiers may be used in the future, and how to modify the present description to accommodate such alternate network identifiers would be clear to those in the art.

While one application of the present invention is to ascertain whether data received as being from an actual radio tag, rather than a device spoofing the MAC address of the radio tag, there are many other applications where it is required to know that a transmitter is authentic, including standard WLAN application in which it is important to detect a spoofing device, and also in wireless personal area networks (PANs) in which it is important to detect a spoofing device.

One embodiment of the invention is designed to operate within present-day technology, e.g., using standard hardware, so that an access point or other receiving station that includes an embodiment of the present invention may be economically realized using readily available wireless station hardware.

Figure 2A:
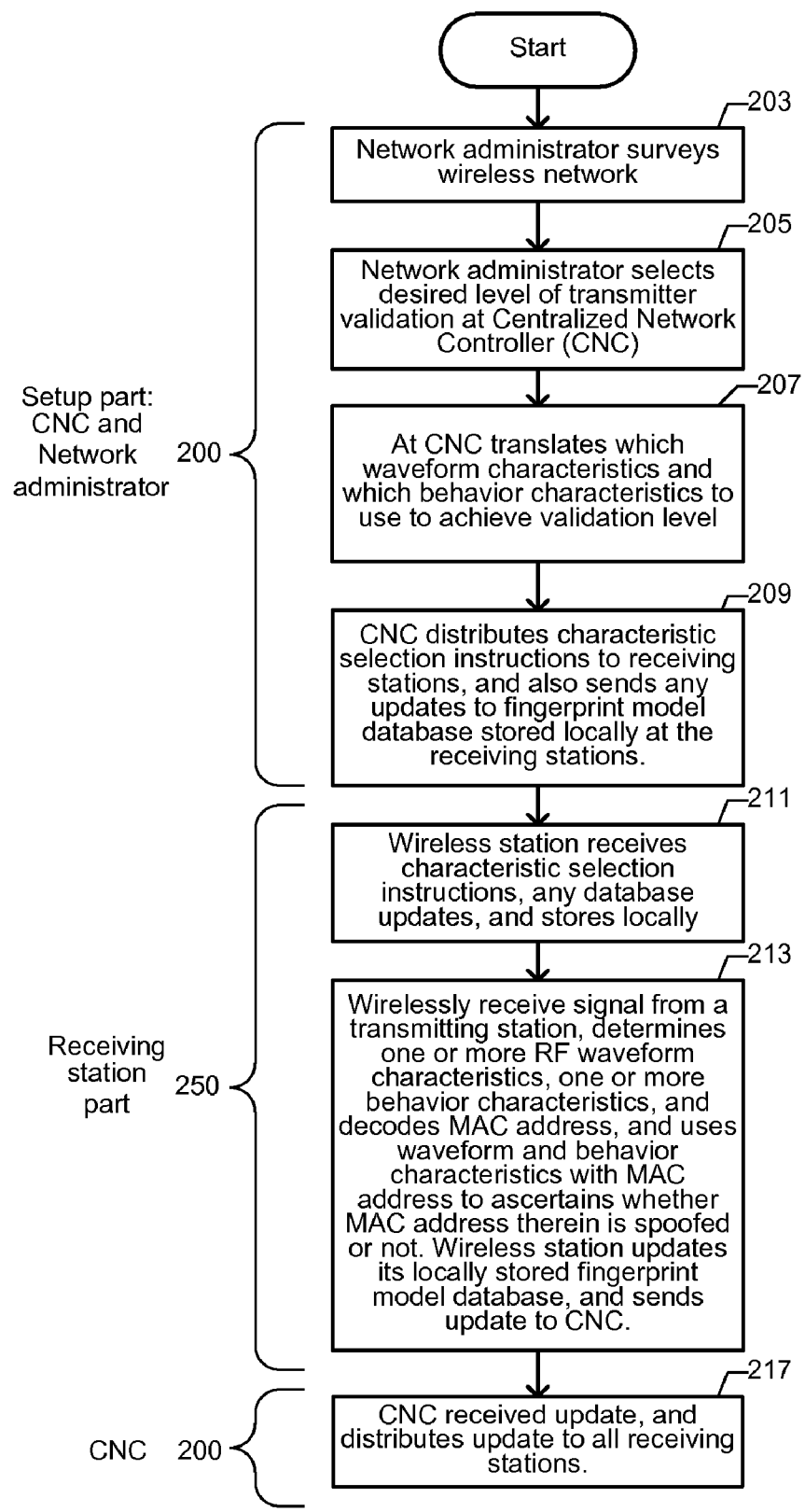
FIG. 2A shows a flowchart of a method embodiment of the invention that occurs at a receiving station, e.g., and access point (AP) of a wireless station.
Figure 2B:
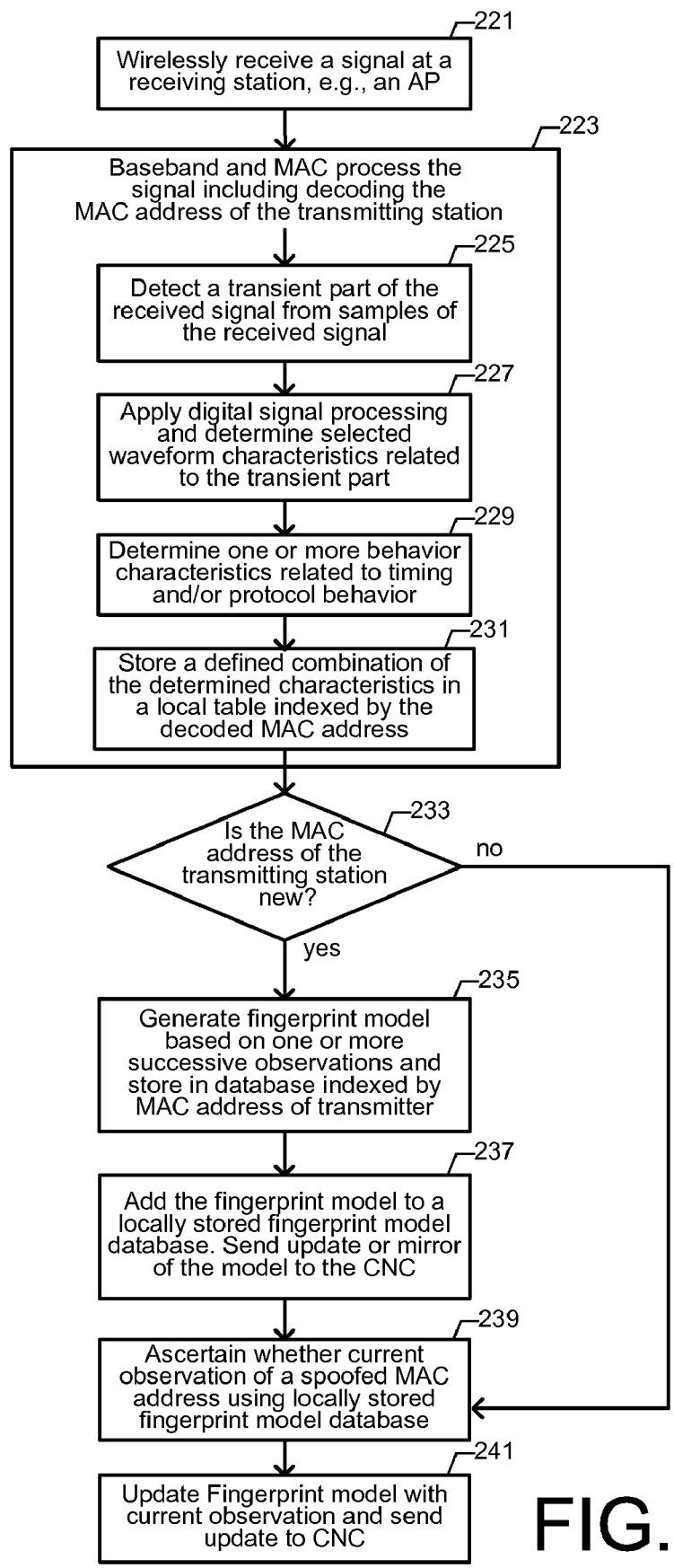
FIG. 2B shows an flowchart that that includes one embodiment of a part that occurs outside the receiving station, e.g., AP, and one embodiment of the part that occurs in the receiving station, e.g., AP.

FIG. 2A shows an overall flowchart that that includes one embodiment of a part 200 that occurs outside a receiving station, e.g., outside an AP, and one embodiment of a part 250 that occurs in the receiving station, e.g., AP. FIG. 2B shows a flowchart of a method embodiment that occurs at the receiving station, e.g., AP.

Starting with FIG. 2B, at the receiving station, AP, one embodiment of the invention includes in 221 receiving a signal transmitted by a transmitting station. The signal includes a MAC address used to identify the transmitting station. The method includes in 223 carrying out baseband and MAC processing 223. In one embodiment the baseband and MAC processing 223 includes in 225 detecting a transient part of the received signal from samples of the received signal, and in 227 applying signal processing to the samples at the transient part to determine one or more waveform characteristics from the received signal. The baseband and MAC processing 223 further includes in 229 determining one or more behavior characteristics, such as one or more protocol-specific behaviors or timing characteristics or both protocol-specific behaviors and timing characteristics. The method further includes in 231 storing a defined combination of the one or more waveform characteristics and the one or more behavior characteristics in a local data structure, e.g., a table indexed by the decoded MAC address.

If the decoded MAC address is a previously encountered MAC address (see block 233), the defined combination of the one or more waveform characteristics and the one or more behavior characteristics is used in 239 to ascertain whether or not the MAC address is a spoofed address, the ascertaining using historical samples of combinations for different MAC addresses. The historical samples are locally stored in the receiving station in a data structure, e.g., a locally stored fingerprint model database.

Another embodiment of the invention includes collecting such historical samples of combinations for different MAC addresses. In the case in 233 it is ascertained that the decoded MAC address is new, a 235 includes generating a new fingerprint model using one or more observations, i.e., determinations of combinations for the MAC address. This fingerprint model is added in 237 to the locally stored fingerprint model database, indexed by the MAC address of the transmitting station.

In one embodiment, 237 includes updating the CNC with the new information.

Turning now to FIG. 2A, the CNC part is now described. When the system is set up, in 203 a network administrator carries out a survey of the wireless network in which the transmitting devices, e.g., radio tags are to operate together with the CNC. In 205, the network administrator determines a desired level of transmitter validation that is required, and then in 207, translates the desired level of performance to which one or more waveform characteristics and which one or more behavior characteristics, such as one or more protocol-specific behaviors or timing characteristics or both to use. There is a trade-off between the number of characteristics and the associated computational complexity to determine such characteristics, and the level of performance achievable. Such a trade-off is determined experimentally.

In one embodiment in which the communication conforms to the IEEE 802.11 standard, the waveform characteristics and behavior characteristics are selected such that they can be determined in an access point that has conventional radio architecture.

In one embodiment, In 207, which one or more transient waveform characteristics and which one or more behavior characteristics is translated to defined information, e.g., instructions on which waveform and which behavior characteristics to determine. In 209, the instructions on which waveform and which behavior characteristics to determine is distributed to the various receiving stations, e.g., APs via the network 107 from a centralized controller, e.g., a controller that includes the location controller. The information includes how to form a combination of the one or more waveform characteristics and one or more behavior characteristics to use to ascertain whether or not a decoded MAC address is spoofed.

One embodiment further includes in 209 the CNC sending to each receiving station any updates to each respective station's locally stored fingerprint model database. Thus, the locally stored database includes information on historical samples stored at both the receiving station and at the CNC. In one embodiment, the locally stored model database includes sample data received at the controller from other stations and sent to the receiving station. In one embodiment, the locally stored model database includes information on historical samples collected locally at the receiving station, and further, collected at other receiving stations. In an alternate embodiment, only locally collected data is used.

At the receiving station, 211 includes the wireless station receiving the characteristic selection instructions, and any updates to the locally stored model database, while 213 includes wirelessly receiving a signal from a transmitting station, determining one or more RF waveform characteristics and one or more behavior characteristics, decoding the MAC address, using waveform and behavior characteristics with the MAC address to ascertain whether the MAC address therein is spoofed or not, updating the wireless station's locally stored fingerprint model database, and sending such update to the CNC, as described above and in FIG. 2B.

In 217, the CNC receives the update, and further distributes the update to other receiving stations.

Returning to FIG. 2B, one embodiment of the invention includes at the receiving station associating the combination of the determined transient and behavior characteristics with the decoded transmitting station MAC address. The defined combination of 231 is called a fingerprint herein. The method includes ascertaining in 239 whether the MAC address is spoofed. After and as a result of the ascertaining, in 241 the fingerprint model us updated and the update is sent to the CNC.

One embodiment of 239 includes comparing the fingerprint determined from the determined transient and behavior characteristics with a model fingerprint for the determined transmitting station MAC address to ascertain the likely legitimacy of the transmitting station having the decoded transmitting station MAC address. The model RF fingerprint is obtained from a set of model fingerprints formed by a method that includes: collecting a plurality, e.g., numerous observations to build model fingerprints for a set of MAC addresses, including one model fingerprint per MAC address and storing the model fingerprints.

In one embodiment, the determined transient characteristics include one or more of amplitude, a phase or a frequency characteristic of the transient portion of received signal.

One embodiment uses a standard wireless station as the receiving station.

In one implementation, model fingerprints are built in the form of a Bayesian filter to ascertain if a particular defined combination is legitimate or not, such that step 239 includes applying a Bayesian filter to the selected combination of determined characteristics. This approach has been proven in industry to effectively classify a current observation based on multiple past observations. Particular defined combinations have particular probabilities of occurring in received signals from the legitimate transmitting station and in spoofed received signals. A Bayesian filter is trained so it can build such probabilities up. To train the filter, data—a defined combinations of characteristics—that are known to be from spoofed signals or known to be legitimate is used for training. For all characteristics in each training combination, the filter adjusts the probabilities that each characteristic will appear as spoofed or legitimate combinations After training, the characteristic probabilities are used to compute the probability that a particular combination of characteristics is from a legitimate or a spoofed received data. The posterior probability is computed using Bayes' theorem.

In more detail, suppose each transmitting station is described by a set of n parameters denoted $X=\{x_1, \ldots, x_n\}$. The parameters are considers as random variables with a known a priori probability density function denoted $p(x)$. The a posteriori probability density function is then used as a measure to determine if a particular set of measurements is from the legitimate transmitter station. The a posteriori probability density function is the conditional probability density function denoted $p(C_t|X)$ and given by $$p(C_t|X) = \frac{p(X|C_t)p(C_t)}{p(X)}.$$

This quantity $p(C_t|X)$ represents the probability of the event, denoted $C_t$, that the transmitter is legitimate, given a particular set of measurements denoted as $X=\{x_1, \ldots, x_n\}$. One method embodiment includes determining the conditional probability density function $p(X|C_t)=p(x_1, \ldots, x_n|C_t)$ during a transmitter training process. The nonconditional probability density function $p(X)=p(x_1)p(x_2)\cdot \ldots \cdot p(x_n)$ (assuming independent features $x_1, x_2, \ldots, x_n$) are assumed to be known by having particular knowledge of the type of transmitters used in the wireless system.

An example of the training process and probability density function assumption for the frequency offset parameter is as follows. The conditional probability density functions for each of the parameter $x_i$, $i=1$, n are estimated during a training process. A relatively large number of measurements are obtained for each parameter when the transmitter is known to not be spoofed. These measurements are used to fit a distribution to the data. One example embodiment using frequency offset includes using a Gaussian distribution to approximate the conditional distribution from the mean and standard deviation of the data. Suppose $x_1$ denoted the frequency offset measurement. The nonconditioned probability density function denoted $p(x_1)$ is obtained from a general knowledge of the transmitter design and oscillator component. The inventors have found that a zero mean Gaussian distribution with a $3\sigma$ distribution at 40 ppm is a reasonable assumption for an IEEE 802.11 type device. A more complex distribution could be used to improve accuracy if for example it was desired to account for any bias in the frequency offset estimator.

The probability density function $p(C_t)$ is chosen between zero and one, and sets the sensitivity or filter gain. This is the probability that a device is being spoofed which in general is unknown; however, it will approach one when the probability is low for spoofed devices. This can be empirically adjusted to increase the sensitivity of the system to detecting spoofed devices.

Figure 3:
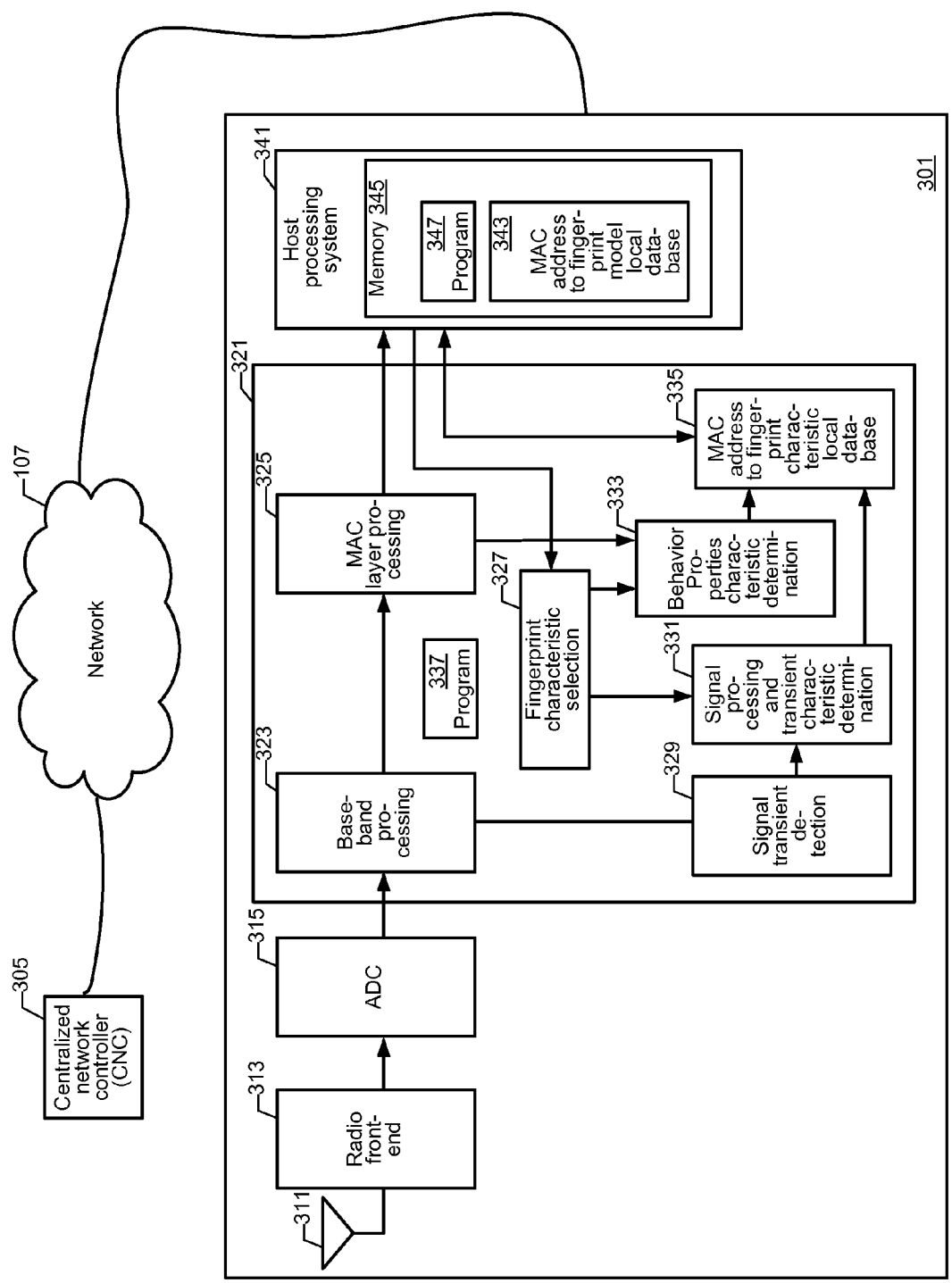
FIG. 3 shows an embodiment of a receiving station coupled to a wireless network which is coupled to a centralized network controller that has features according to an embodiment of the present invention.

FIG. 3 shows a system in a wireless network that includes a receiving station 301 which in one embodiment is an access point (AP) coupled via a network 107 to a centralized network controller (CNC) 305, also simply called "network controller." In one embodiment, the location server 109 is part of the centralized network controller 305. The parts used when the receiving station 301 is receiving are mainly described herein, and those in the art will understand that the receiving station 301 is also operable to transmit. The receiving station 301 includes one or more antennas 311 and a radio front-end 313. In the case that the receiving station 301 is receiving, a received signal is received by the radio front-end 313 and digitized by one or more analog-to-digital converters (ADC) 315 coupled to a baseband and MAC processing system 321 that includes a baseband processing subsystem 323 coupled to the ADC 315 and operable to receive samples of the received signal and process such signals, e.g., to demodulate and decode the samples of the received signal to produce a bitstream. The baseband processing subsystem 323 is coupled to a MAC processing subsystem 325 that is operable to form received MAC frames and operate according to the MAC protocol of the wireless network. The MAC layer processing subsystem 325 is coupled to a host processing system 341 which includes one or more processors, a host memory 345, and a network interface, and that is coupled via the network interface to the network 107.

In one embodiment, the baseband and MAC processing system 321 of the receiving station 301 includes one or more processors, and a memory. The memory, which in different embodiments includes RAM and ROM, includes program memory that carries instructions 337 that when executed by the one or more processors, and in one embodiment, in combination with dedicated baseband processing and MAC layer processing hardware, implements the baseband processing, MAC processing, and additional processing for implementing part of embodiments of the present invention. Those in the art will understand that there are many ways that the functionality of unit 321 can be split between hardware and software 337, and many chips are available in the market that provide such functionality. A property of some embodiments of the present invention is that they can be realized with readily available hardware using a receiving station architecture that requires only minor modifications, e.g., different programming of the one or more programmable processors to carry out the functionality described herein The baseband and MAC processing system 321 includes a fingerprint characteristics selection subsystem 327 operable to receive information from the host processing system 341 on what waveform characteristics, e.g., characteristics of the transient part to use and which one or more behavior characteristics, such as protocol-specific behaviors or timing characteristics or both to use in a defined combination with the waveform characteristic or characteristics to form a fingerprint. The baseband and MAC processing system 321 includes a signal detection subsystem 329 coupled to the baseband processing subsystem 323 and operable to detect the transient part of a received signal from the samples of a received signal. A signal processing and transient characteristics calculation subsystem 331 is coupled to the signal transient detection unit 329 and the fingerprint characteristics selection subsystem 327 and is operable to determine one or more waveform characteristics from the detected transient part according to the information in the fingerprint characteristics selection subsystem 327. Similarly, a behavior characteristics calculation subsystem 333 is coupled to the MAC layer processing subsystem 325 and the fingerprint characteristics selection subsystem 327 and is operable to determine one or more behavior characteristics, such as one or more protocol-specific behaviors or timing characteristics or both, according to the information in the fingerprint characteristics selection subsystem 327. Information formed by the signal processing and transient characteristics calculation subsystem 331 and the behavior characteristics calculation subsystem 333 is stored in the memory of the baseband and MAC processing system 321 together with the MAC address of the source according to MAC address information decoded from the received signal, the storing being in the form of a data structure, e.g., a database called the MAC address to fingerprint characteristics local database 335.

In one embodiment, the host processing system 341 includes in its memory 345 software 347 operable to carry out method steps including using the information from the MAC address-to-fingerprint characteristics local database 335 to form a defined combination of the one or more waveform characteristics and the one or more transient characteristics, and to use the formed fingerprint to ascertain whether or not the decoded MAC address is a spoofed MAC address using data stored in a data structure of the host processing system's memory 345, e.g., as a database called the MAC address to fingerprint model local database 343 that contains historical samples of combinations and MAC addresses.

The information in the MAC address to fingerprint model local database 343 is obtained from the centralized network controller 305. In one embodiment, the centralized network controller 305 collects such data from various receiving stations, e.g., access points in the network over time.

Note that in FIG. 3 the baseband and MAC processing subsystem includes some programmable elements, including one or more programmable processors. Another embodiment includes elements that are settable using different programmable parameters, e.g., via registers that can be loaded with parameters, but in such an alternate embodiment, the main programmable processing system that is programmed so that the receiving station implements some of the features of the present invention is the host processing system 341.

Furthermore, while FIG. 3 shows the transient characteristic calculation subsystem 331, the behavior characteristic calculation subsystem 333, and the MAC address to fingerprint characteristics local database 335 all implemented in the baseband and MAC processing system 321, alternate embodiments have more of these elements operating by the program 347 executing on the host processing system. Thus, it is the combination of the baseband and MAC processing system 321 and the host processing system 341 that include the elements 327, 329, 331, 333, and 335 that in FIG. 3 are shown to be in the baseband and MAC processing system 321.

Figure 4:
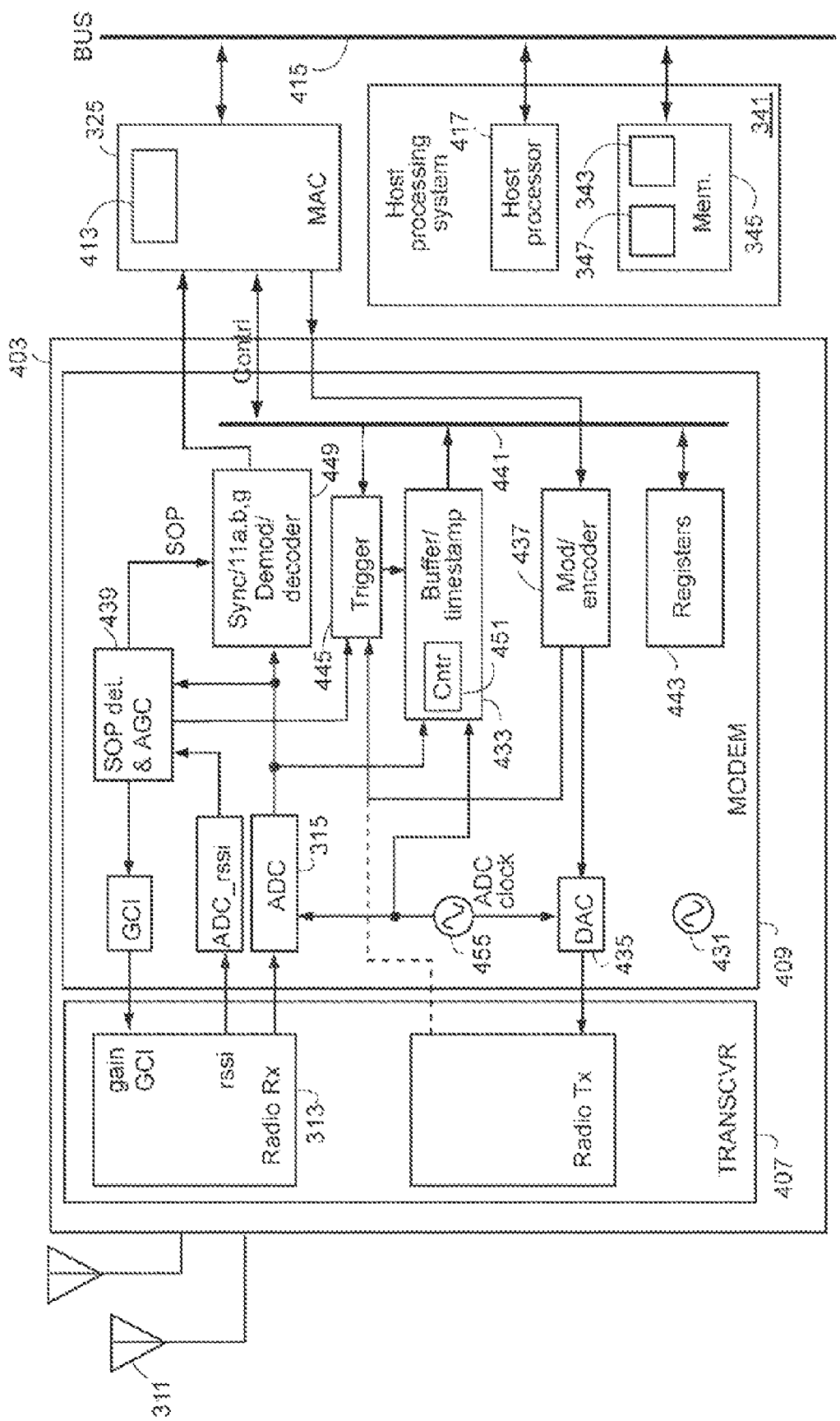
FIG. 4 shows one embodiment of a wireless station that may be an AP and that implements one or more aspects of the invention.

Many modern receivers for operating in an IEEE 802.11 conforming environment include in the baseband and MAC processing part 321 that is operative to store of a set of samples of part of a received signal. FIG. 4, for example, is taken from U.S. patent application Ser. No. 10/803,367 to Crawford, et al. titled RADIOLOCATION IN A WIRELESS NETWORK USING TIME DIFFERENCE OF ARRIVAL, the contents of which are incorporated herein by reference, and shows one embodiment of a wireless station that may be an AP or a client station and that with suitable programming is operable to implement one or more features of the present invention. While some of the components of FIG. 3 are also shown in FIG. 4, possibly using different reference numerals.

The wireless station of FIG. 4 includes one or more antennas 311 that are coupled to a radio 403 that includes an analog radio transceiver 407 and a digital modem 409. The radio 403 is coupled to a MAC processing subsystem 325 that implements the MAC processing of the wireless station. The MAC processing subsystem 325 is connected via one or more busses, shown symbolically as a single bus subsystem 415, to a host processing system 341 including a host processor 417. The host processing system 341 includes a memory subsystem 345, e.g., RAM and/or ROM connected to the host bus, shown here as part of bus subsystem 415. Not shown is an included interface to a wired network, e.g., network 107.

In one embodiment, the MAC processing, e.g., the IEEE 802.11 MAC protocol, is implemented totally at the MAC processing subsystem 325. The MAC processing subsystem 325 includes a memory 413 that stores the instructions for the MAC processing subsystem 325 to implement some of the MAC processing, and in one embodiment, some of the additional processing used by the present invention. The memory is typically but not necessarily a ROM and the software is typically in the form of firmware.

In one embodiment, the MAC processing subsystem 325 is controlled by the host processor 417. In one embodiment, some of the MAC processing is implemented at the MAC processing subsystem 325, and some is implemented at the host. In such a case, the instructions for the host 417 to implement the host-implemented MAC processing are stored in the memory 345.

In one embodiment, some or all of the additional processing used by the present invention is also implemented by the host. These instructions are shown as part 347 of memory 345.

The analog transceiver 407 includes a receiver 313 and a transmitter. The receiver 313 outputs one or more received signal strength indicator (RSSI) signals and the received signal, in one embodiment in the form of an analog low-intermediate-frequency (low-IF) received signal of 40 MHz bandwidth centered at 40 MHz. The receiver 313 accepts gain control signals from the digital modem via a gain control interface.

The transmitter accepts I and Q quadrature baseband signals from the modem 409 and transmits the signals at a power setting controlled from the modem. Such control is not shown in FIG. 4.

The digital modem accepts the analog low-IF received signals and digitizes them using an analog-to-digital converter 315 to generate a sequence of received signals. The ADC 315 samples at a sample rate determined by an ADC clock 455 that in turn is related to a local clock 431. In one embodiment, the ADC samples at 80 MHz.

Note, those in the art will understand that by clocks being related we mean that the rates of the clocks are related. Thus, the statement the ADC clock 455 is related to the local clock 431 would be understood to mean that there is a relationship between the rate of the ADC clock 455 and the rate of the local clock 431.

The RSSI signal is also digitized, and both the received signal samples and the RSSI signal(s) are inputed to a start of packet (SOP) and automatic gain control (AGC) subsystem 439 that determines when start of packet SOP occurs, and also generates signals to automatically provide signals via a gain control interface to the analog receiver 313 for gain control. In one embodiment, the start of packet includes determining the transient part of the received signal used in embodiments of the present invention.

The received signal samples are input to a synchronization/demodulator/decoder subsystem 449 for 802.11a, 802.11b, and 802.11g signals that includes an OFDM subsystem and a DSSS/CCK subsystem. The OFDM (802.11a,g) subsystem includes a synchronization circuit, a time to frequency converter, a demodulator, and a decoder; the DSSS/CCK (802.11b) subsystem includes a demodulator and a decoder. Either of these interprets the preamble of the packet, and then decodes any header information. The header information may include information on how to decode the remainder of the payload information in the packet, according to the appropriate standards. The output of the synchronization/demodulator/decoder subsystem 449 includes decoded packet data that is provided to the MAC processing subsystem 325 for MAC layer processing.

The synchronization circuit includes determining frequency offset as used in some embodiments of the present invention as one of the behavior characteristics in the received signal.

The modem further includes a trigger circuit 445 coupled to the receiver and transmitter to indicate when a packet is received and when a packet is transmitted, a timestamping subsystem, e.g., a timestamping clock coupled to the local clock 431, and a buffer subsystem coupled to the trigger subsystem 445. The embodiment shown includes a combined timestamping/buffer subsystem 433 that includes a counter 451, and it would be clear to those in the art that this combined unit may be implemented as two separate subsystems. The timestamping/buffer subsystem 433 accepts the received signal samples, a measure of the ADC clock, and an early SOP indication from the SOP and AGC subsystem 439 via the trigger 445. The buffer/timestamp subsystem 433 stores the sample values for a period of time, and further has the ability to timestamp the stored samples. In one embodiment, the timestamping is according to the counter 451, and the counter 451 increments at the same frequency as the ADC clock, such that the timestamping is according to the ADC clock.

In alternate embodiments, the ADC clock runs at a frequency that is an integer multiple of the frequency of the timestamping subsystem. In one such alternate embodiment, the timestamping subsystem includes a clock, e.g., a counter that counts at ½ the frequency of the ADC clock.

One aspect of the invention uses the buffer/timestamp subsystem 433 to capture and timestamp received signal samples for later processing in order to determine an exact time of the start of packet, the transient part of the received signal, and the one or more transient waveform characteristics.

The modem 409 includes a bus subsystem 441 coupled to the MAC processing subsystem 325, and to the buffer/timestamp subsystem 433. The bus subsystem 441 enables the MAC processor to provide control signals to the modem, including setting the values of a set of control registers 443. The bus system further enables the MAC to obtain information from the register set 443, and also to obtain timestamped samples from the buffer/timestamping subsystem 433.

For transmitting, the modem further includes a modulator/encoder to generate complete packets according to the version of the standard, e.g., 802.11 standard being used, including preamble information, header information, and payload of MAC frames provided by the MAC processing subsystem 325. The output of the modulator/encoder subsystem 437 are converted to analog signals, in one embodiment, baseband or low IF I,Q signals by a digital-to-analog converter set 435. The analog to-be-transmitted signals are accepted by the radio transmitter part of the transceiver 407. The transmitter generates the antenna signals that are transmitted via the one or more antennas, in one embodiment, the same as the receiver antenna(s) 311.

Not shown in FIG. 4 are many of the signal paths, e.g., between the various subsystems and the register set 443.

RF Waveform Characteristics

Research has shown that the characteristics of a transmitting station may not only be unique across vendors but also unique within a collection of equipment from the same vendor. The majority of the research shows that the transmitter turn-on transients contain enough unique information to form a "RF fingerprint". RF fingerprinting to determine such an RF fingerprint from one or more determined waveform characteristics of the transient part of a transmitter signal been applied to both military and cellular telephone applications. See, for example: 1) J. Hall, M. Barbeau and E. Kranakis in "Enhancing Intrusion Detection in Wireless Networks Using Radio Frequency Fingerprinting," Communications, Internet and Information Technology (CIIT), St. Thomas, US Virgin Islands, Nov. 22-24, 2004, and available (Mar. 12, 2007) at http://www.scs.carleton.ca/~jhall2/; 2) K. J. Ellis and N.

Serinken in "Characteristics of radio transmitter fingerprints," Radio Science, Volume 36, Issue 4, p. 585-598; 3) J. Hall, M. Barbeau, and E. Kranakis, in "Detection of Transient in Radio Frequency Fingerprinting using Phase Characteristics of Signals," Proceedings of the 3rd IASTED International Conference on Wireless and Optical Communications (WOC 2003), Jul. 14-16, 2003, Banff, Alberta, Canada, and available (Mar. 12, 2007) at http://www.scs.carleton.ca/~jhall2/; and 4) J. Hall, M. Barbeau, and E. Kranakis in "Radio Frequency Fingerprinting for Intrusion Detection in Wireless Networks, submitted to IEEE Transactions on Dependable and Secure Computing, and available (Mar. 12, 2007) at http://www.scs.carleton.ca/~jhall2/.

It should be noted that the term RF fingerprint as used in the above cited literature and in this disclosure is different and should not be confused with what also has been termed "RF Fingerprint" technology by Airespace, Inc, now part of Cisco Systems, Inc., and related to the Assignee of the present invention. Airespace's "RF Fingerprint" is described, e.g., in "RF Fingerprinting: Enabling Accurate Location Tracking for WLANs," available Mar. 8, 2007 at http://www.airespace.com/technology/technote_rf_fingerprinting.php, and involves a virtual grid overlay of a given environment—a given volume where a location system is to keep track of how a signal propagates to any location on the grid. The Airespace definition has to do with the propagation to different locations in a given environment.

Embodiments of the present invention include determining characteristics of the transient part of a received signal.

Detecting the Transient:

Most commercial radio transceivers for use in IEEE 802.11 WLANs, in particular those that use OFDM versions of the standard, such as IEEE 802.11a and 802.11g include an accurate start-of-packet detector. See for example, U.S. Pat. No. 7,151,759 to inventors Ryan et al. Alternate methods use cross correlation of samples of the received signal with known parts of a signal, e.g., part of the preamble of a packet according to the physical layer standard.

One embodiment of the receiving station's baseband processing subsystem 323 includes a start-of-packet detector that generates start of packet information. In one embodiment, the signal transient detection subsystem 329 uses start of packet information from the start of packet detector to determine the transient portion.

An alternate embodiment of the signal transient detection subsystem 329 uses a method described in the above Hall et al. publications.

One embodiment of the present invention includes a receiver that captures, via a hardware buffer, a set of samples around the start of packet. See FIG. 4 and its description above, in particular, the buffer/timestamping subsystem 433. In one embodiment, the samples so captured are used to detect the transient turn-on part of the waveform and to calculate therefrom the one or more waveform characteristics.

Determining the Waveform Characteristics

One embodiment of the invention includes determining the phase and amplitude at a transient part of the received waveform. In one embodiment, the radio front end, ADC and baseband and MAC processing system 321 of the receiving station are such that complex-values samples, e.g., samples of I and Q quadrature components of the received signal are obtained. The determining of the waveform characteristics includes determining the measure of the phase and amplitude at a transient time of the waveform. The phase and amplitude are determined from I and Q, with the phase being unwrapped, as necessary. In one embodiment, a measure of the instantaneous frequency also is obtained. The Signal processing and transient characteristics extraction subsystem 331 accepts the samples at the transient part and determine these characteristics therefrom.

Another embodiment, described in the above-referenced Hall et al. publications, uses the discrete Wavelet transform that applies to samples at a transient part of the received signal waveform, as determined from the start of packet information.

Another embodiment uses amplitude and phase characteristics as described in the above-referenced Ellis and Serinken publication. That publication describes an identification process of various transmitters based on amplitude and phase characteristics of a transient (turn on) portion of the generated signal. A transient portion of signal is characterized based on an amplitude profile just before steady state, the settling time to reach steady state, amplitude variations after steady state has been reached and changes in the slope of the signal phase profile.

One skilled in the art would know how to implement signal processing methods to so determine the transient waveform characteristics in the signal processing and transient characteristics extraction subsystem 331. In addition, the above cited publications by Hall et al., and Ellis et al. describe methods for carrying out such signal processing.

RF Behavior Characteristics

This invention includes but is not limited to determining and using at least one of the following behavior characteristics of a transmitting station.

Transmitter Amplitude Variation

One measure that may characterize a transmitting station is a measure of the variation in the amplitude of the transmitted signal over time, e.g., for the duration of a frame. A receiving station includes automatic gain control. See FIG. 4. One measure of the transmitter amplitude variation is the variation of the received signal amplitude over time, e.g., throughout a received frame after the receiver automatic gain control locks to a particular gain.

Signal Strength Variation Compared to the Time of Arrival

One embodiment uses a characteristic that is calculated from the variations in received signal strength indication (RSSI) compared to the time difference of arrival (TDOA) with another wireless station. Wireless stations typically provide a measure of the RSSI and of time of arrival. The architecture shown in FIG. 4 is capable of determining the time of arrival and also time differences of arrival. A jump in RSSI that is not accompanied by a change in TDOA may indicate that a transmitting station with a higher or lower power transmitter has replaced the original transmitting station.

Signal Strength-based Location vs. Time Difference of Arrival Based Location Determination.

Methods are known and used to determine location of a transmitting station using signal strength, e.g., using path loss estimates. Methods also are known and used that determine location using time difference of arrival (TDOA). One embodiment includes in the one or more behavior features a measure related to the difference between the location determined using the signal strength and the location determined using TDOA.

Error Vector Magnitude (EVM).

One embodiment of the receiving station, e.g., AP includes an EVM determiner. See, for example, U.S. Pat. No. 6,898,198 to inventor Ryan et al., for an example of a station that includes an EVM calculator, and such EVM-calculation-capable wireless stations are available commercially, e.g., from Cisco Systems, Inc., the assignee of the present invention. One behavior characteristic is the relationship of the EVM of the received signal to the data rate of the data contained therein. Some transmitters will push higher output power at lower data rates with a corresponding degradation in EVM of the received signal.

Data Rate Shifting

One embodiment uses as one or more behavior characteristics one or more rate shifting characteristics of communication between the transmitting station and the receiving station. One such characteristic is the number of retries before the transmitting station transmits at a lower rate. Another such characteristic is whether or not any multi-step rate changing occurs, or only step-by step rate changing occurs.

Sleep Interval Characteristic.

One embodiment uses as one or more behavior characteristics one or more sleep interval characteristics. For example, in the case of detecting radio transmitting RF tags, if a tag is replaced with a spoofed version at some instant in time, it is likely that the sleep interval of the transmit cycle will change.

Frequency Offset Variations

One embodiment uses as one or more behavior characteristics one or more measures of variations in the frequency offset. It is expected that a transmitting client uses at least one crystal oscillator to generate at least one frequency reference. Throughout the day the frequency of such an oscillator drifts with temperature variation. Many receiving stations include in the baseband signal processing determining and correcting for frequency offset, and in the case that the receiving station receives signals from the same transmitting station many times in a day, the variation of frequency offset throughout the day is indicative of the frequency variation at the transmitting station. Such frequency variation over time is thus a characteristic of a particular wireless device. Typically, temperature variations throughout the day are similar from day-to-day. One embodiment includes checking whether or not the extremes of the frequency offset tracks, e.g., the difference between minimum and maximum frequency offset within a pre-defined period of time. Such a measure therefore may be characteristic of the transmitting station, e.g., as a measure that is indicative of the variation of frequency versus temperature of any crystal oscillator used in the transmitting station.

MIMO or SISO

One embodiment uses as a behavior characteristic a change in whether the transmitting station is operating as a single input single output (SISO) transmitting station, or as a station for operation in a multiple input multiple output (MIMO) system. A SISO transmitting station might be spoofed by a MIMO client or vice versa. One or more indications may be present in the received signal to indicate whether or not the transmitting station is operating as a SISO or a MIMO station.

Time Difference of Arrival Variations

One embodiment uses as a behavior characteristic an assessment of small differences in TDOA reference clocks between transmitters. The architecture shown in FIG. 4 is capable of determining the time of arrival and also time differences of arrival, and can be used to assess small differences in the clocks that were used in the sending packets.

Transmit Channel Template

One embodiment uses as a behavior characteristic observation and assessment of transmit channel template. The infrastructure typically "knows" the transmission pattern, but without the use of a data acquisition system and spectragram calculation SW, it is difficult for a malicious person to determine what that pattern is.

Thus, one embodiment of the invention uses local copies of the characteristics models to make observation comparisons with newly acquired combinations of one or more waveform and one or more behavior characteristics. The models also are sent to the centralized controller 305 that may include the location controller 109. Thus, the models can be used as stations come into service and out of service in the network. This provides sharing transmitter models across APs in the network.

One embodiment includes a controlled training session before tagging high value assets.

Some embodiments of the present invention can be used to determine legitimacy of both location radio tags and traditional wireless client stations. One implementation of the invention is independent of any IEEE 802.1x authentication used in the network. In one embodiment, the spoofing verification is an override to IEEE 802.1x authentication to provide firewall-like characteristics to a given wireless LAN system. In another implementation, the spoofing verification described herein is used for, or as a pre-requisite to any IEEE 802.1x authentication used in the network.

One implementation of the present invention can be integrated into an existing radio design, e.g., that of FIG. 4 by programming the host processing system and if needed the MAC processor 325 to carry out, in combination with the hardware, the method described herein.

Another implementation is designed, for example into a radio that is designed for location tracking only, to include only the digital samples to be provided by the baseband processor to a processing entity. This processing entity will perform digital signal processing to determine amplitude, phase and frequency characteristics of the waveform once the start of the packet has been detected. Further the source MAC address of the incoming packet will be provided by the wireless MAC and will be associated with the transmitter characteristics.

Thus, some embodiments of the invention enables validation of a wireless network transmitting station using its transmitter characteristics and behaviors as indicated by the one or more transient waveform characteristics and one or more behavior characteristics of a signal received from a transmitting station.

Embodiments have been described that combine proven RF transmitter fingerprinting using one or more transient waveform characteristics with one or more behavior characteristics in a manner that can be calculated using straightforward receiving station hardware combined with software. A system is described that uses existing radio building blocks and digital signal processing to samples already acquired, e.g., in hardware for time of arrival location processing.

In the description herein, the analog-to-digital conversion may be, but is not necessarily at baseband, thus the samples of the received signal are not necessarily baseband samples. In one embodiment using the architecture shown in FIG. 4, the samples are low-intermediate-frequency samples that are further digitally downconverted in the digital modem. In the future, it is expected that wireless station architectures will have more and more of the functionality of the radio in the digital domain, so that the samples will be at a relatively higher frequency.

In FIG. 1, it is assumed that the receiving station is an AP. The architecture of the access point is such that much of processing to determine the signal transient, select and determine one or more waveform characteristics from samples of a received signal, determine one or more behavior characteristics, such as one or more protocol-specific behaviors or timing characteristics or both for the received signal, and the ascertaining whether the decoded MAC address is spoofed, occurs locally in one or more processing systems within the wireless station acting as the AP. In an alternate embodiment, a so-called lightweight AP is used that operates in conjunction with an AP controller connected via the network, wherein a secure tunnel is maintained between the AP and the AP controller once the AP is part of the network. In one such embodiment, the Control And Provisioning of Wireless Access Points (CAPWAP) protocol is used for such communication between the AP and its AP controller. CAPWAP is described in (Mar. 12, 2007) at http://www.capwap.org/draft-ietf-capwap-protocol-specification-05.txt. One embodiment uses what is basically an earlier version of CAPWAP called the Lightweight Access Point Protocol (LWAPP). The AP controller in a lightweight AP embodiment includes a processing system with one or more processors, and much of the processing for the ascertaining whether or not a decoded MAC address is a spoofed address occurs in the AP controller. How to modify the description herein to design an AP controller based method would be straightforward to those in the art, so no further description is needed herein to enable such a modifying of the description herein for such an alternate embodiment.

Also, while the description herein and FIG. 1 assumes that APs receive the signal from a transmitting device in order to ascertain whether or not the transmitting device is spoofing a MAC address, in alternate embodiments of systems, e.g., location based systems, a known client station of an AP, e.g., a client at a known location receives information for location determining and sends such information to an AP for further processing using a pre-defined protocol for sending such information. See, for example, U.S. Patent Application Publication US 20050171720 to inventors Olson et al. for a description of one such protocol. Much of the processing occurs in the AP. In yet another embodiment, much of the processing occurs in the received station, whether the AP or a known client station of an AP. How to modify the description herein to design a method that includes analyzing and using data received at a client station would be straightforward to those in the art, so no further description is needed herein to enable such a modifying of the description herein for such an alternate embodiment.

It should be appreciated that although the invention has been described in the context of the IEEE 802.11 standard, the invention is not limited to such contexts and may be utilized in various other applications and systems.

In keeping with common industry terminology, the terms "base station", "access point", and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

The invention may be embodied in receivers and transceivers operating in many RF frequency ranges. Furthermore, while a transceiver embodiment for operation conforming to variants of the IEEE 802.11 standards has been described, the invention may be embodied in transceivers conforming to other standards and for other applications, including, for example other WLAN standards and other wireless standards.

"Variants of the IEEE 802.11 standard" as used herein means the variants and proposed variants of the IEEE 802.11 standard. Variants are versions defined in clauses of the standard and proposed amendments of the standard.

Applications that can be accommodated include IEEE 802.11 wireless LANs and links, Radiolocation applications using active (transmitting) radio tags, Personal Area Networks such as Bluetooth, wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), GSM, PHS, CDMA, and other cellular wireless standards.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) logic encoded on one or more computer-readable media containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries logic (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium on which is encoded logic, e.g., in the form of instructions.

Furthermore, a computer-readable carrier medium may form, or be includes in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the logic including instructions, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a wireless receiving station. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries logic including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present invention. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media also may also take the form of acoustic or light waves, such as those generated during radio wave and infrared data communications. For example, the term "carrier medium" shall accordingly be taken to include, but not be limited to: (i) in one set of embodiments, a tangible computer-readable medium, e.g., a solid-state memory, or a computer software product encoded in computer-readable optical or magnetic media; (ii) in a different set of embodiments, a medium bearing a propagated signal detectable by at least one processor of one or more processors and representing a set of instructions that when executed implement a method; (iii) in a different set of embodiments, a carrier wave bearing a propagated signal detectable by at least one processor of the one or more processors and representing the set of instructions a propagated signal and representing the set of instructions; and (iv) in a different set of embodiments, a transmission medium in a network bearing a propagated signal detectable by at least one processor of the one or more processors and representing the set of instructions.

It will be understood that the steps of methods discussed are performed in one embodiment by an appropriate processor (or processors) of a processing (i.e., computer) system executing instructions stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A method of operating a receiving station of a wireless network, the method comprising:
    wirelessly receiving at the receiving station a signal transmitted from a transmitting station in the wireless network, the signal including a network identifier of the transmitting station;
    detecting a transient part of the received signal;
    determining from samples of the transient part of the received signal one or more RF waveform characteristics of the transient part of the received signal;
    decoding the received signal to determine the network identifier;
    determining one or more behavior characteristics from the received signal;
    and using the decoded network identifier and a combination of the one or more waveform characteristics of the transient part and the one or more behavior characteristics to ascertain whether or not the network identifier is a spoofed address, the ascertaining using historical samples of combinations for different network identifiers, wherein the one or more behavior characteristics include at least one of the set consisting of:
    a measure of error vector magnitude of the received signal as a function of the data rate, the measure of the error vector magnitude determined by an element included in the wireless receiver configured to determine the measure of the error vector magnitude,
    a measure of whether a variation in the received signal strength indication is accompanied by a change in a difference in time of arrival of the received signal and a signal from a second transmitting station, and
    at least one measure of variations in the frequency offset as determined by a frequency offset determining element included in the wireless receiver as an indication of the variation of frequency in a day of any oscillator used in the transmitting station.

2. A method as recited in claim 1, wherein the network identifier is the MAC address.

3. A method as recited in claim 1, wherein the one or more behavior characteristics include the transmit channel pattern.

4. A method as recited in claim 3, wherein the one or more RF waveform characteristics are from the transient part of the received signal and include an amplitude characteristic and a phase characteristic.

5. A method as recited in claim 1, wherein the one or more RF waveform characteristics are from the transient part of the received signal and include at least a phase characteristic.

6. A method as recited in claim 1, wherein the one or more RF waveform characteristics are from the transient part of the received signal and include at least a frequency characteristic.

7. A method as recited in claim 1, wherein the one or more RF waveform characteristics are from the transient part of the received signal and include at least two characteristics from the set of one or more amplitude characteristics, one or more phase characteristics, and one or more frequency characteristics.

8. A method as recited in claim 1, wherein the one or more behavior characteristics include a measure of the variation of received signal amplitude over time.

9. A method as recited in claim 1, wherein the one of the determined one or more behavior characteristics is a measure of whether a variation in the received signal strength indication is accompanied by a change in a difference in time of arrival of the received signal and a signal from a second transmitting station.

10. A method as recited in claim 1, wherein the receiving station includes an element that is configured to determine a measure of error vector magnitude of the received signal, and wherein the one or more behavior characteristics include a measure of the error vector magnitude of the received signal as a function of the data rate of communication.

11. A method as recited in claim 1, wherein the one or more behavior characteristics include one or more data rate shifting characteristics of communication between the transmitting station and the receiving station.

12. A method as recited in claim 1, wherein the one or more behavior characteristics include at least one sleep interval characteristic.

13. A method as recited in claim 1, wherein the receiving station includes an element that is configured to determine frequency offset, and wherein the determined one or more behavior characteristics include at least one measure of variations in the frequency offset as an indication of the variation of frequency in a day of any oscillator used in the transmitting station.

14. A method as recited in claim 1, wherein the one or more behavior characteristics include a change in whether the transmitting station is operating as a single input, single output transmitting station, or as a station for operation in a multiple input, multiple output system.

15. A method as recited in claim 1, wherein the ascertaining of whether or not the network identifier is a spoofed network identifier uses a Bayesian filter applied to the combination used for the ascertaining of whether or not the network identifier is a spoofed address.

16. A method as recited in claim 1, wherein the ascertaining of whether or not the network identifier is a spoofed network identifier includes determining a signature from the combination and looking up a data structure that includes model signatures for a plurality of network identifiers.

17. A method as recited in claim 16, wherein the data structure includes model signatures indexed by network identifiers, and wherein the looking up uses the decoded network identifier.

18. A method as recited in claim 1, further comprising receiving updates from a controller of historical sample data for use in the ascertaining.

19. A method as recited in claim 18, wherein the received historical sample data includes historical samples received at the controller from other wireless stations.

20. An apparatus comprising:
one or more antennas and a radio front-end;
one or more analog-to-digital converters coupled to the radio front-end and operable to form samples of a signal received via the antennas at the radio front-end from a transmitting station of a wireless network;
a baseband and MAC processing system that includes a baseband processing subsystem coupled to the one or more analog-to-digital converters and a MAC processing subsystem, the baseband and MAC processing system operable to process the samples of the received signal, including demodulating and decoding the samples; forming received MAC frames; and decoding any network identifier of the transmitting station of the received signals contained in the in the MAC frames; and
a host processing system that includes one or more host processors, a host memory; and a network interface operable to couple the apparatus to a network,
wherein the combination of the baseband and MAC processing system and the host processing system includes a transient characteristic calculation subsystem operable to determine from samples of the transient part of the received signal one or more waveform characteristics of the transient part of the received signal, and a behavior characteristic calculation subsystem operable to determine one or more behavior characteristics, and
wherein the combination of the baseband and MAC processing system and the host processing system is operable to form a defined combination of the one or more determined waveform characteristics of the transient part of the received signal, and the one or more determined behavior characteristics and ascertain, using the formed combination and historical samples of combinations for different network identifiers, whether or not the decoded network identifier is a spoofed network identifier,
wherein the one or more behavior characteristics includes at least one of the set consisting of:
a measure of error vector magnitude of the received signal as a function of the data rate, the measure of the error vector magnitude determined by an element included in the wireless receiver configured to determine the measure of the error vector magnitude,
a measure of whether a variation in the received signal strength indication is accompanied by a change in a difference in time of arrival of the received signal and a signal from a second transmitting station,
at least one measure of variations in the frequency offset as determined by a frequency offset determining element included in the wireless receiver as an indication of the variation of frequency in a day of any oscillator used in the transmitting station, and
that a variation in the signal strength from the transmitting station and another transmitting station is accompanied by a corresponding change in the time difference of arrival of a signal from the transmitting station and the other transmitting station as determined by a time of arrival determining element in the wireless receiver.

21. An apparatus as recited in claim 20, wherein the baseband and MAC processing system includes one or more programmable processors and memory.

22. An apparatus as recited in claim 20,
wherein the baseband and MAC processing system includes a fingerprint characteristic selection subsystem operable to store information on which one or more waveform characteristics to determine and which one or more behavior characteristics to determine,
wherein the waveform characteristic calculation subsystem is coupled to the fingerprint characteristic selection subsystem and is operable to determine the one or more waveform characteristics according to information in the fingerprint characteristic selection subsystem, and
wherein the behavior characteristic calculation subsystem is coupled to the fingerprint characteristic selection subsystem and is operable to determine the one or more behavior characteristics according to information in the fingerprint characteristic selection subsystem.

23. A tangible computer-readable storage medium comprising executable instructions stored thereon that when executed cause:
a receiving station to wirelessly receive a signal transmitted from a transmitting station in a wireless network, the signal including a network identifier of the transmitting station;
detecting a transient part of the received signal;
determining from samples of the transient part of the received signal one or more RF waveform characteristics of the transient part of the received signal;

decoding the received signal to determine the network identifier;

determining one or more behavior characteristics from the received signal;

and using the decoded network identifier and a combination of the one or more waveform characteristics of the transient part and the one or more behavior characteristics to ascertain whether or not the network identifier is a spoofed address, the ascertaining using historical samples of combinations for different network identifiers, wherein the one or more behavior characteristics include at least one of the set consisting of:

a measure of error vector magnitude of the received signal as a function of the data rate, the measure of the error vector magnitude determined by an element included in the wireless receiver configured to determine the measure of the error vector magnitude, a measure of whether a variation in the received signal strength indication is accompanied by a change in a difference in time of arrival of the received signal and a signal from a second transmitting station, and at least one measure of variations in the frequency offset as determined by a frequency offset determining element included in the wireless receiver as an indication of the variation of frequency in a day of any oscillator used in the transmitting station.

24. An apparatus comprising:

means for wirelessly receiving at a receiving station a signal transmitted from a transmitting station in a wireless network, the signal including a network identifier of the transmitting station;

means for detecting a transient part of the received signal;

means for determining from samples of the transient part of the received signal one or more RF waveform characteristics of the transient part of the received signal;

means for decoding the received signal to determine the network identifier;

means for determining one or more behavior characteristics from the received signal;

and means for using the decoded network identifier and a combination of the one or more waveform characteristics of the transient part and the one or more behavior characteristics to ascertain whether or not the network identifier is a spoofed address, the ascertaining using historical samples of combinations for different network identifiers, wherein the one or more behavior characteristics include at least one of the set consisting of:

a measure of error vector magnitude of the received signal as a function of the data rate, the measure of the error vector magnitude determined by an element included in the wireless receiver configured to determine the measure of the error vector magnitude, a measure of whether a variation in the received signal strength indication is accompanied by a change in a difference in time of arrival of the received signal and a signal from a second transmitting station, at least one measure of variations in the frequency offset as determined by a frequency offset determining element included in the wireless receiver as an indication of the variation of frequency in a day of any oscillator used in the transmitting station, and that a variation in the signal strength from the transmitting station and another transmitting station is accompanied by a corresponding change in the time difference of arrival of a signal from the transmitting station and the other transmitting station as determined by a time of arrival determining element in the wireless receiver.

25. A method as recited in claim 1, wherein the one or more behavior characteristics include a difference in the location of the transmitting station as determined using different location determining methods.

26. A method as recited in claim 1, wherein the one or more behavior characteristics include time difference of arrival variations for signals from the transmitting station and another transmitting station.

27. A method as recited in claim 1, wherein the receiving station is operable as an access point or standard wireless station of the wireless network and the transmitting station is an actual or spoofed radio tag or an actual or spoofed client station of the wireless network.

\* \* \* \* \*